United States Patent
Ryu et al.

(10) Patent No.: US 12,458,968 B2
(45) Date of Patent: Nov. 4, 2025

(54) MULTI-LAYERED BIOSENSOR CHIP AND BIOMARKER MEASURING APPARATUS USING THE SAME

(71) Applicant: ELECTRONICS AND TELECOMMUNICATIONS RESEARCH INSTITUTE, Daejeon (KR)

(72) Inventors: Jin Hwa Ryu, Daejeon (KR); Han Young Yu, Daejeon (KR); Bong Kuk Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 910 days.

(21) Appl. No.: 17/677,665

(22) Filed: Feb. 22, 2022

(65) Prior Publication Data
US 2022/0371014 A1 Nov. 24, 2022

(30) Foreign Application Priority Data
May 24, 2021 (KR) .................. 10-2021-0066376

(51) Int. Cl.
*B01L 3/00* (2006.01)
*G01N 33/543* (2006.01)
(Continued)

(52) U.S. Cl.
CPC .. *B01L 3/502715* (2013.01); *G01N 33/54386* (2013.01); *G01N 33/563* (2013.01);
(Continued)

(58) Field of Classification Search
CPC ....... B01L 3/502715; B01L 2300/0819; B01L 2300/0887; B01L 2300/12;
(Continued)

(56) References Cited

U.S. PATENT DOCUMENTS

| | | | |
|---|---|---|---|
| 8,018,595 B2 | 9/2011 | Huh et al. | |
| 10,408,825 B2 | 9/2019 | Kim et al. | |
| KR 10-1537171 | 7/2015 | | |
| KR 10-2016-0047395 | 5/2016 | | |
| KR 2016-0134111 | 11/2016 | | |
| KR 10-1878255 | 7/2018 | | |
| KR 10-2019-0108009 | 9/2019 | | |

FOREIGN PATENT DOCUMENTS

| KR | 10-0635110 B1 | 10/2006 |
|---|---|---|
| KR | 10-0719898 B1 | 5/2007 |

(Continued)

OTHER PUBLICATIONS

Wan-Joong Kim, et al., "Sensitive capillary ELISA via vapor-phase surface modification", Sensors and Actuators B, vol. 233, Oct. 5, 2016, pp. 281-288.

*Primary Examiner* — Dennis White

(57) ABSTRACT

The present invention relates to a biosensor technique in which multiple types of target substances (biomarkers) contained in saliva or the like are allowed to be simultaneously measured or N samples for one target substance (biomarker) are allowed to be simultaneously measured and reliability of sensed results and high sensitivity are secured. A fluidic channel-based planar biosensor chip, in which a plurality of fluidic channels capable of measuring target substances (biomarkers) are embedded in one flat plate sensor chip and the flat plate sensor chip is measured by a light-emitting element (optical source) and a light-receiving element, and a biomarker measuring apparatus using the same are provided.

9 Claims, 7 Drawing Sheets

(51) Int. Cl.
  *G01N 33/563* (2006.01)
  *G01N 33/58* (2006.01)
(52) U.S. Cl.
  CPC .... *G01N 33/581* (2013.01); *B01L 2300/0819* (2013.01); *B01L 2300/0887* (2013.01); *B01L 2300/12* (2013.01)
(58) Field of Classification Search
  CPC ............... B01L 3/502761; B01L 3/502; B01L 2200/0684; B01L 2300/025; B01L 2300/0663; B01L 2300/0851; G01N 33/54386; G01N 33/563; G01N 33/581; G01N 33/54366; G01N 21/8483; G01N 33/535
  See application file for complete search history.

(56) References Cited

U.S. PATENT DOCUMENTS

| | | | |
|---|---|---|---|
| 2006/0017030 A1* | 1/2006 | Koeneman | F16K 99/0011 251/129.06 |
| 2010/0081216 A1* | 4/2010 | Yager | B01L 3/5027 436/524 |
| 2011/0129846 A1 | 6/2011 | Huh et al. | |
| 2012/0261264 A1* | 10/2012 | Srinivasan | B01F 33/3021 427/58 |

* cited by examiner

MULTI-LAYERED BIOSENSOR CHIP AND BIOMARKER MEASURING APPARATUS USING THE SAME

CROSS-REFERENCE TO RELATED APPLICATION

This application claims priority to and the benefit of Korean Patent Application No. 10-2021-0066376, filed on May 24, 2021, the disclosure of which is incorporated herein by reference in its entirety.

BACKGROUND

1. Field of the Invention

The present invention relates to a biosensor chip for measuring the mental and physical health status of animals including human, and a biomarker measuring apparatus using the biosensor chip.

2. Discussion of Related Art

All animals as well as humans need to be managed in order to maintain their mental and physical health status. Health status can be checked by monitoring status changes such as stress, inflammation in the body, viruses, enzymes, and the like. In order to monitor current health status information, biological samples such as blood, urine, feces, saliva, and the like are collected. However, recently, with advances in medicine and related technologies, a technique for obtaining and testing samples in a non-invasive way is being highlighted in order to solve the problems of biological sample collection.

In particular, since saliva contains a large amount of biomarkers indicating health status information, a method of monitoring health status in a non-invasive way is being actively studied. Saliva of animals, which include humans, contains many components such as cortisol, alpha-amylase, immunoglobulin A (IgA), serum amyloid A (SAA), C-reactive protein (CRP), and haptoglobin. These components have been recognized for their effectiveness against stress, immunity, inflammation, or the like and are being used as biomarkers, which are indexes that measure the degree of mental/physical health status, and research thereon is being actively conducted.

Biosensor technology is a technology for qualitatively/quantitatively analyzing the presence or absence of a specific substance (component) and many studies are being conducted on the technology in various fields. Among the studies, enzyme-linked immunosorbent assay (ELISA) technology, which uses an antigen-antibody specific reaction, has been recognized for its excellence in precision and stability and is emerging as a major technology in the biosensor field. The ELISA technology is a technology for measuring optical signal transmittance with respect to a biosensor chip that performs an antigen-antibody specific reaction by using a light-emitting element (optical source) having a specific wavelength, and thus the presence or absence of a specific substance such as a biomarker and the quantitative content concentration can be measured.

However, in the ELISA technology, stable and precise analysis is possible but limitations in that expensive dedicated equipment, a long analysis time, professional manpower, and complicated processes are required are included. In order to overcome these limitations, various technologies are being studied and developed.

SUMMARY OF THE INVENTION

The present invention is directed to providing a biosensor technique in which multiple types of target substances (biomarkers) contained in saliva or the like are allowed to be simultaneously measured or N samples for one target substance (biomarker) are allowed to be simultaneously measured and reliability of sensed results and high sensitivity are secured.

According to an aspect of the present invention, there is provided a fluidic channel-based planar biosensor chip, in which a plurality of fluidic channels capable of measuring target substances (biomarkers) are embedded in one flat plate sensor chip and the flat plate sensor chip is measured by a light-emitting element (optical source) and a light-receiving element, and a biomarker measuring apparatus using the same.

A vertical cross-sectional structure of the biosensor chip is implemented as a flat sheet type composed of an upper plate, an intermediate part, and a lower plate, and due to the intermediate part, a plurality of space-independent fluidic channels are formed between the upper plate and the lower plate in an array structure when viewed from above. That is, a biosensor chip for measuring optical signal transmittance by applying a biomarker to a fluidic channel containing a chromogenic enzyme detection antibody and a capture antibody includes a lower plate, an upper plate positioned to be spaced an interval from the lower plate, and at least one intermediate part which are positioned between the lower plate and the upper plate such that the interval between the lower plate and the upper plate becomes at least one fluidic channel.

An antibody or antigen that specifically reacts with a target substance (biomarker) is fixed onto an inner surface of the fluidic channel. As a result, a multifunctional biosensor chip capable of simultaneously detecting multiple types of target substances (biomarkers) or simultaneously detecting N target substances (biomarkers) of one type at one time is provided.

The biosensor chip is inserted into a biomarker measuring apparatus so that the target substances (biomarkers) are measured. A 1×N optical splitter device may be used below (or above) the biosensor chip for long-term or repetitive improvement of uniformity. One of optical signals output from the optical splitter device is detected by a light-receiving element without being transmitted through the sensor chip and is used as a reference signal, and the remaining (N−1) optical signals are each transmitted through each individual fluidic channel and are each detected by the light-receiving element so that the characteristics of the biomarkers are measured.

According to an aspect of the present invention, there is provided a biosensor chip having a multi-layer (e.g., four-layer) structure for improving the characteristics of a sensor, and a biosensor chip having a high specific surface area structure.

In the biosensor chip and the biomarker measuring apparatus using the same according to the present invention, enzyme-linked immunosorbent assay (ELISA) technology is simply implemented using a fluidic channel-based high sensitivity biosensor chip capable of simultaneous detecting multiple target substances (biomarkers).

The configuration and operation of the present invention described above will be clearer through specific embodiments described below with reference to the accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention and methods of achieving the same will be made clear from embodiments described in detail below with reference to the accompanying drawings. However, the present invention may be embodied in many different forms and should not be construed as being limited to the embodiments set forth herein. Rather, these embodiments are provided so that this disclosure will be thorough and complete and will fully convey the scope of the present invention to those of ordinary skill in the technical field to which the present invention pertains. The present invention is only defined by the appended claims. Meanwhile, the terms used herein are provided only to describe the embodiments and are not intended to limit the present invention. In this specification, the singular forms include the plural forms as well unless the context clearly indicates otherwise. It will be understood that the terms "comprise" and/or "comprising," when used herein, specify some stated components, steps, operations, and/or elements but do not preclude the presence or addition of one or more other components, steps, operations, and/or elements.

Hereinafter, first, exemplary embodiments of a multifunctional biomarker measuring apparatus based on a multi-layered biosensor chip will be described.

Figure 1:
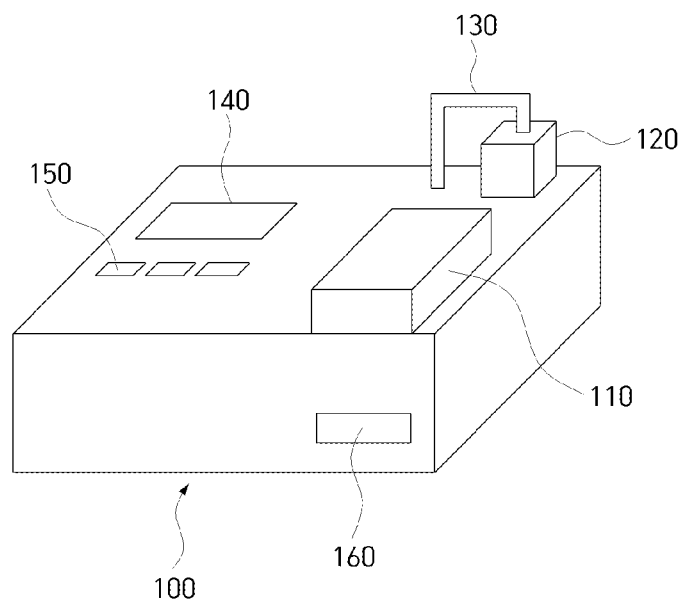
FIG. 1 illustrates a structure of a multifunctional biomarker measuring apparatus according to an embodiment of the present invention.

FIG. 1 schematically illustrates a structure of one embodiment of a multifunctional biomarker measuring apparatus 100 using a multi-layered biosensor chip according to the present invention. The biomarker measuring apparatus 100 includes a sensor chip application unit 110 in which the biosensor chip ("sensor chip") of the present invention is inserted and mounted to measure a sensed result, a mixed solution supply unit 120 which provides a mixed solution containing a substrate to the sensor chip, a supply tube 130 through which the mixed solution is supplied to the sensor chip, a waste solution collecting unit 160 which discharges a waste solution produced after the mixed solution supplied to the sensor chip reacts with the sensor chip, a control unit 150 which controls the biomarker measuring apparatus 100, and a display unit 140 on which a measurement result of the sensor chip is displayed.

The operation of the biomarker measuring apparatus 100 is as follows. When the biosensor chip to be described below is mounted on the sensor chip application unit 110 and a measurement start button of the biosensor control unit 150 is pressed, the mixed solution is supplied from the mixed solution supply unit 120 to the sensor chip that is mounted on the sensor chip application unit 110 through the supply tube 130, and the mixed solution after the reaction with the sensor chip is completed is collected in the waste solution collecting unit 160. In this process, the characteristics of the sensor chip are measured by the sensor chip application unit 110 and results of the measurement are displayed on the display unit 140.

The sensor chip application unit 110 includes a stage in which an intaglio stepped cavity having a structural shape and dimension substantially identical to those of the biosensor chip to be described below is formed, and thus the biosensor chip may be inserted in the intaglio stepped cavity with a simple operation to be easily mounted on the stage in an aligned state. Further, a light-emitting element and a light-receiving element are respectively disposed above and below the stage to irradiate the sensor chip with light, receive the light transmitted through the sensor chip, and measure the characteristics of the biomarker supplied to the sensor chip. A detailed description thereof will be given below.

Figure 2:
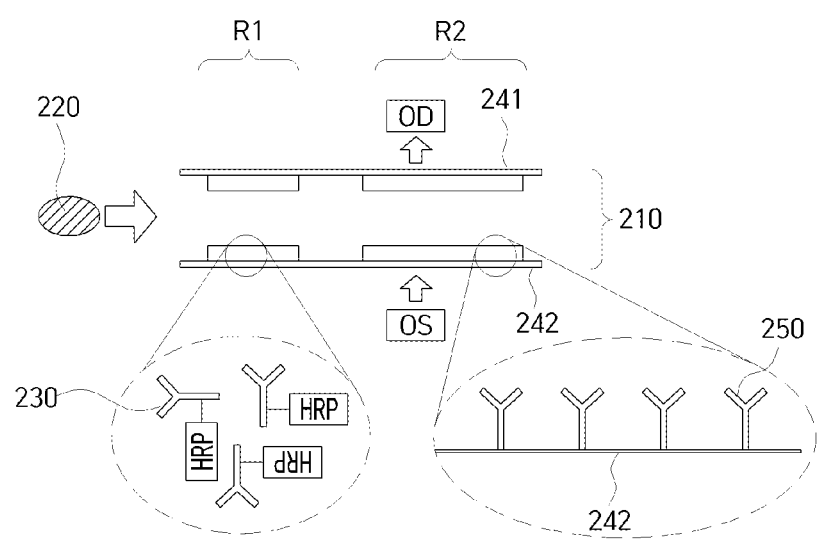
FIG. 2 is a conceptual diagram of a fluidic channel-based biosensor chip according to the present invention.

FIG. 2 is a conceptual diagram illustrating a basic structure and measurement principle of a fluidic channel based biosensor chip inserted and mounted in the sensor chip application unit 110 illustrated in FIG. 1. FIG. 2 illustrates a longitudinal cross-sectional structure of one fluidic channel 210 formed in the biosensor chip, however in reality the biosensor chip is implemented in an array structure in which a plurality of fluidic channels 210 are arranged (see FIG. 3).

The fluidic channel 210 is divided into a first region R1 and a second region R2. In the first region R1, chromogenic enzyme (horseradish peroxidase (HRP)) detection antibodies 230 are bound, and in the second region R2, capture antibodies 250 are fixed onto inner surfaces of an upper surface 241 and a lower surface 242 of the fluidic channel 210.

In order to form the HRP detection antibodies 230 and the capture antibodies 250 in the first region R1 and the second region R2, freeze-drying may be used. The freeze drying method is performed by fixing the capture antibodies 250 to the fluidic channel 210, inserting a solution containing a chromogenic enzyme detection antibody 230 into the fluidic channel 210, and then cooling the fluidic channel 210 in a freeze dryer at minus 20° C. to freeze-dry the fluidic channel 210.

In the manufacturing of the biosensor chip, the operation of binding the chromogenic enzyme (HRP) detection antibodies 230 to the first region R1 of the fluidic channel 210 is performed by absorbing the solution containing the chromogenic enzyme detection antibody 230 onto a paper type pad (conjugation pad) such as a nonwoven fabric and then inserting the paper type pad into the first region R1 of the fluidic channel 210. In addition, a sample pad may be added to an opening at a front end of the conjugation pad. In addition, in the operation of fixing the capture antibodies 250 to the second region R2, a capture antibody solution may be fixed onto the inner surface of each of the upper surface 241 and the lower surface 242 of the fluidic channel by means of spotting. Thereafter, through cooling and freeze drying in the freeze dryer and assembling freeze-dried substrates, the manufacturing of the biosensor chip may be completed.

Meanwhile, in order to measure a biomarker using the biosensor chip, a light-emitting element (optical source (OS)) and a light-receiving element (optical detector (OD)) are provided with the fluidic channel 210 of the biosensor chip interposed therebetween (e.g., in the sensor chip application unit 110 of the biomarker measuring apparatus of FIG. 1). By mounting the biosensor chip, in which the fluidic channel is embedded, in the sensor chip application unit 110 of the biomarker measuring apparatus 100 in which the light-emitting element (OS) and the light-receiving element (OD) are provided, target substances (biomarkers) are measured.

The measurement of the biomarker will be described with reference to the biosensor chip, in which the fluidic channel 210 is embedded as illustrated in FIG. 2, and the biomarker measuring apparatus 100 of FIG. 1.

When a solution containing a target antigen 220 is applied to the fluidic channel 210 of the biosensor chip, a binding reaction to a complex of target antigen-detection antibody-chromogenic enzyme occurs in the first region R1 due to an antigen-antibody specific reaction, and the complex fluid is moved to the second region R2 due to a capillary force. When the complex fluid reaches the second region R2, the target antigen 220 in the complex fluid specifically reacts with the capture antibodies 250 fixed onto the inner surfaces of the upper surface 241 and the lower surface 242 of the fluidic channel, and thus a sandwich structure of capture antibody-target antigen-detection antibody-chromogenic enzyme is generated and is fixed onto an inner wall of the fluidic channel.

Meanwhile, the biosensor chip pretreated as described above is mounted in the sensor chip application unit 110 of the biomarker measuring apparatus 100. Accordingly, the mixed solution is supplied from the mixed solution supply unit 120 of the biomarker measuring apparatus 100 to an opening (to be described below) in the second region R2 of the fluidic channel 210 of the biosensor chip through the supply tube 130, and flows toward the first region R1. Subsequently, the complex fluid that does not react with the capture antibodies 250 fixed to the inner wall of the fluidic channel is collected in the waste solution collecting unit 160 for disposal.

The mixed solution supplied to the fluidic channel 210 of the biosensor chip contains a substrate and an oxidizing agent such as hydrogen peroxide, and thus the color development of the substrate occurs by the chromogenic enzyme (HRP) in the complex fixed to the inner wall of the fluidic channel. The presence or absence of color development and the degree of color development are measured by the light-emitting element (OS) at one side of the biosensor chip and the light-receiving element (OD) at the other side of the biosensor chip, and measurement results are displayed on the display unit 140 of the biomarker measuring apparatus 100. A measurement target is the optical signal transmittance of the biosensor chip.

The substrate contained in the mixed solution may be one selected from among 3,3',5,5'-tetramethylbenzidine (TMB), 3,3'-diaminobenzidine (DAB), and 2,2'-azino-bis(3-ethyl-benzothiazoline-6-sulphonic acid) (ABTS). Since the degree of color development of the substrate is determined depending on an amount of the target antigen 220 applied to the fluidic channel 210, the measurement results indicate the presence or absence of the target antigen and the content of the target antigen.

Figure 3A:
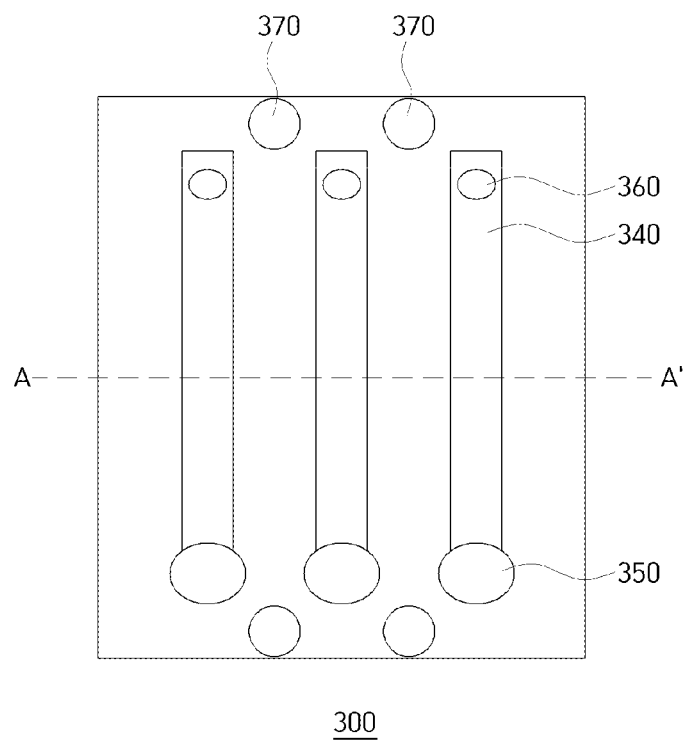
FIGS. 3A and 3B are configuration diagrams of a biosensor chip having a flat plate structure in which fluidic channels are arranged in an array structure according to an embodiment of the present invention.
Figure 3B:
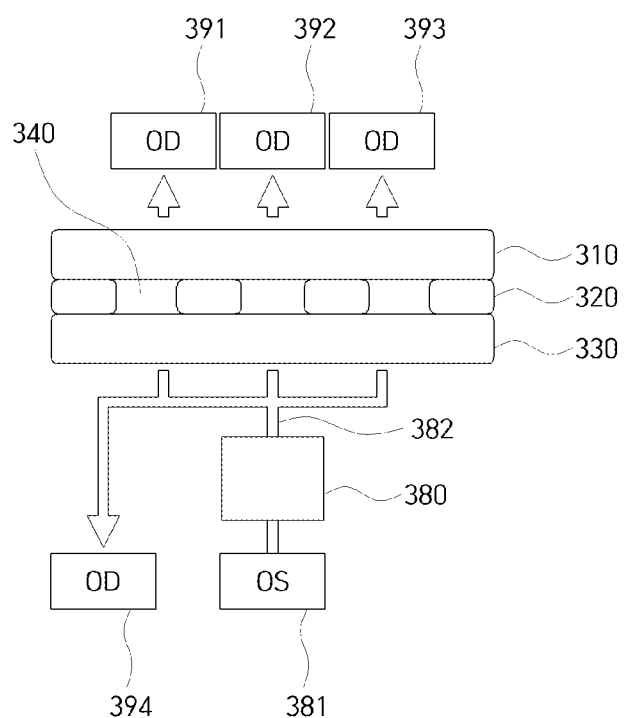

FIGS. 3A and 3B are views illustrating an embodiment in which a biosensor chip 300 is actually implemented in a structure in which fluidic channels are arranged in an array structure, wherein FIG. 3A is a plan view of the biosensor chip 300, and FIG. 3B is a cross-sectional view taken along line A-A' of FIG. 3A.

The biosensor chip 300 is basically implemented in a structure having a lower plate 330, an intermediate part 320, and an upper plate 310. In the present embodiment, the biosensor chip 300 includes a lower plate 330, an upper plate 310 positioned to be spaced an interval from the lower plate 330, and an intermediate part 320 which is positioned between the lower plate 330 and the upper plate 310 such that three fluidic channels 340 are provided in the interval between the lower plate 330 and the upper plate 310.

The intermediate part 320 may have adhesiveness to fix the upper plate 310 and the lower plate 330 and may be formed in a geometric structure in which the three fluidic channels 340 are provided in an array structure in a plan view. A thickness, that is, a height, of the fluidic channel depends on a thickness of the intermediate part 320, and the fluidic channel may be implemented to have a thickness of about 100 μm to 1,000 μm and may be implemented to have a width of about 1 mm to 10 mm. The upper plate 310 and the lower plate 330 may be implemented using a polycarbonate (PC) substrate and the intermediate part 320 may be implemented using an acrylic foam tape. In the above structure, surfaces on which the capture antibodies are fixed are an upper surface of the lower plate 330 and a lower surface of the upper plate 310 and form a two-layer structure.

As the lower plate 330 and the upper plate 310, any material having excellent light transmittance may be used. Generally, the lower plate 330 and the upper plate 310 may be implemented using glass, quartz, and general-purpose polymers such as PC, poly(methyl methacrylate) (PMMA), polystyrene (PS), a cyclic olefin copolymer (COC), and the like.

Alignment holes 370 having the same/similar structures and dimensions are formed at the same/similar positions of the lower plate 330, the intermediate part 320, and the upper plate 310, and thus layers may be simply arranged and stacked using a dedicated jig (not illustrated) when the biosensor chip is manufactured.

Further, referring to FIG. 3A, each of the fluidic channels 340 of the biosensor chip 300 includes a first opening 350 into which the solution containing the target antigen 220 (see FIG. 2) flows and a second opening 360 into which the mixed solution (see FIG. 1) containing the substrate flows. These two openings are formed in opposite surfaces (upper plate and lower plate). Specifically, the first opening 350 is a hole through which the solution containing the target antigen flows, and may be formed in the lower plate 330, and the second opening 360 is a hole through which the mixed solution containing the substrate, such as a TMB solution, flows, and may be formed in the upper plate 310.

The same antibody material may be formed in each fluidic channel 340 of the biosensor chip 300. Alternatively, different antibody materials may be formed for each fluidic channel 340 so that multiple types of target antigens may be simultaneously measured.

Meanwhile referring to FIG. 3B, the light-emitting element (OS) and the light-receiving element (OD) are provided with the fluidic channels 340 interposed therebetween to face each other. Only one light-emitting element 381 and one light-receiving element 394 are provided below the biosensor chip 300, and one light-receiving element 391, 392, or 393 is provided above the biosensor chip 300 for each fluidic channel 340. This is a structure for increasing the reliability of measurement results and a detailed description thereof is as follows.

Optical signals that are output from the light-emitting element 381 provided below the biosensor chip 300 are split by a 1×N optical splitter device 380 and are irradiated to the fluidic channel 340 as measurement signals (sensing signals). Here, "N=the number of fluidic channels+1." That is, in the present embodiment, a 1×4 optical splitter device 380 is used. Light emitted from the light-emitting element 381 is split into four optical signals 382 through the 1×4 optical splitter device 380. Three optical signals among the split optical signals 382 are irradiated to a lower portion of the biosensor chip 300. These three optical signals are transmitted through the biosensor chip 300 and measured by the light-receiving elements 391, 392, and 393 allocated to the respective fluidic channels 340. Further, the remaining optical signal is not transmitted through the biosensor chip 300 and is detected as a reference signal by the light-receiving element 394 illustrated in a lower side of FIG. 3B. In FIG. 3B, although the light-receiving element 394 is illustrated as being positioned below the biosensor chip 300, the light-receiving element 394 serves to receive light that is not transmitted through the biosensor chip, and thus the light-receiving element 394 may be positioned anywhere above or below the biosensor chip 300 as long as the light-receiving element 394 can perform such a function.

When the light-emitting element is individually used for each fluidic channel, there are limitations in terms of the reliability of repeatability of measurement results and of the reliability according to the characteristics of the light-emitting element due to long-term use. However, as described above, when the measurement signals and the reference signal are measured separately using the optical splitter device 380, such limitations are solved by comparing the reference signal and the measurement signals.

As described above, by using the biosensor chip 300 having the structure in which the fluidic channels are arranged in an array structure, it is possible to simultaneously measure multiple types of highly sensitive target substances (biomarkers). In addition, by using the optical splitter device 380 for splitting optical signals irradiated from one light-emitting element in order to compare the reference signal and the measurement signals, it is possible to obtain an effect of improving the reliability of the measurement results.

Figure 4A:
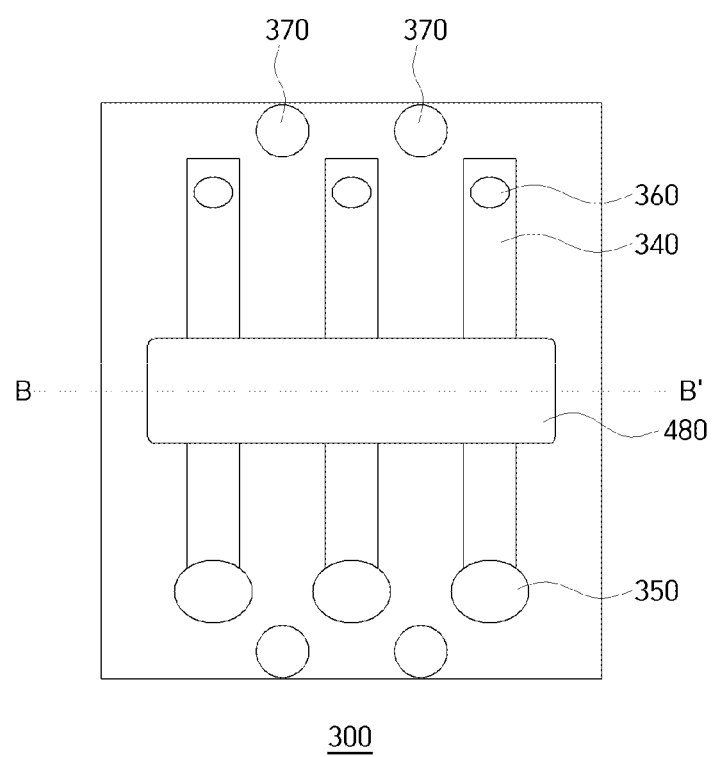
FIGS. 4A to 4C are configuration diagrams of a multi-layered biosensor chip according to another embodiment.
Figure 4B:
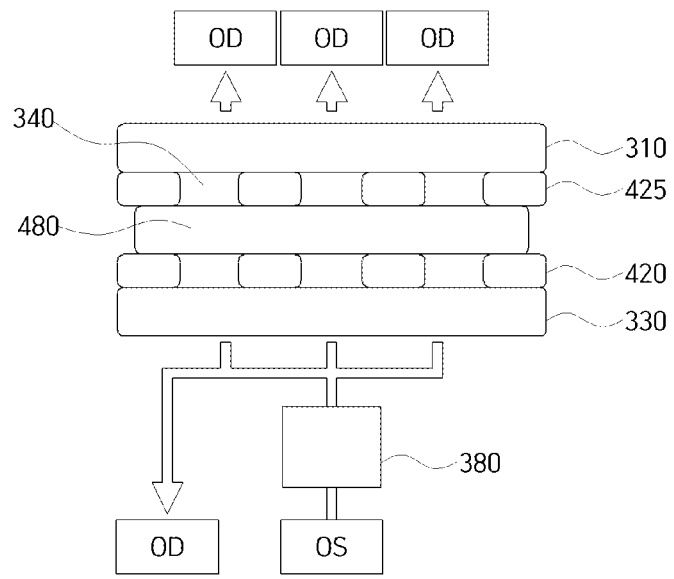
Figure 4C:
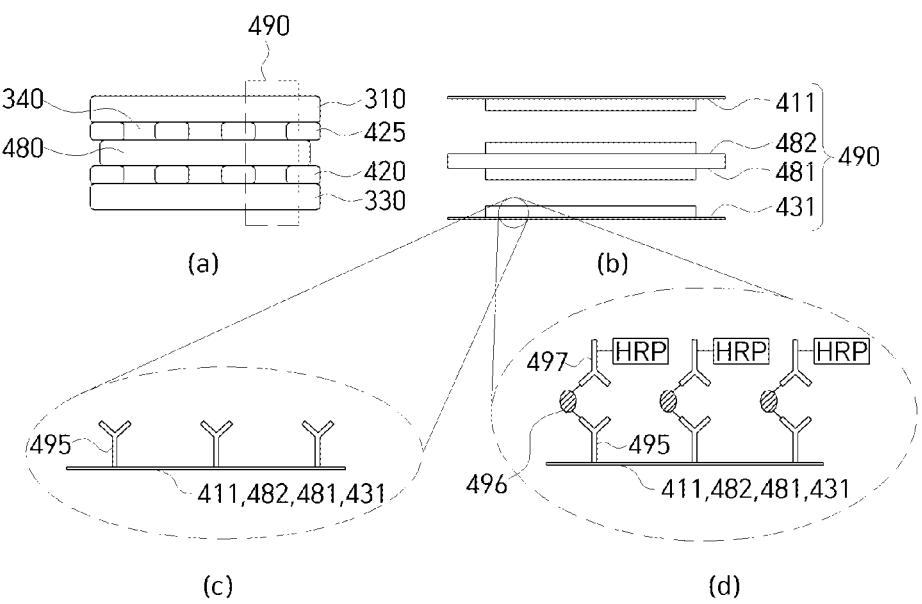

FIGS. 4A and 4B are views illustrating another embodiment and are views illustrating a structure of a multi-layered biosensor chip 300, in which the biosensor chip illustrated in FIGS. 3A and 3B is used as a basic structure and an intermediate plate 480 is additionally inserted in an intermediate part to improve the characteristics of a biosensor. FIG. 4A is a plan view of the biosensor chip 300, and FIG. 4B is a cross-sectional view taken along line B-B' of FIG. 4A. FIG. 4C illustrates a view (a) of an arbitrary section 490 of a multi-layered fluidic channel of FIG. 4B, which is formed according to the insertion of the intermediate plate 480, a longitudinal cross-sectional view (b) of the arbitrary section 490, a schematic view (c) of the sensor chip before reaction, and a schematic view (d) of the sensor chip after reaction.

In FIGS. 4A and 4B, a basic configuration is the same as that illustrated in FIGS. 3A and 3B. A structural difference from FIGS. 3A and 3B is that the intermediate part 320 of FIG. 3B is divided into two parts according to the additional insertion of the intermediate plate 480 to become a first intermediate part 420 and a second intermediate part 425. The plan view of FIG. 4A illustrates a state in which an upper plate 310 is removed in order to show the intermediate plate 480.

However, although there may be a problem in that bubbles are generated due to a difference in filling speed of a fluid according to a change in thickness (i.e., vertical height) of the fluidic channel 340 between the first opening 350 and the second opening 360 according to the insertion of the intermediate plate 480, the problem may be solved by applying a negative pressure for generating a relative pressure difference to one of the two opening 350 and 360. Further, although there may be a problem in that gaps are generated at interfaces between the two intermediate parts 420 and 425 and the intermediate plate 480 due to the inherent thickness of the intermediate plate 480 according to the insertion of the intermediate plate 480, the problem may be solved by designing and reflecting the elongation characteristics of the materials of the two intermediate parts 420 and 425. In the present embodiment, it is confirmed that, when the thickness of the intermediate plate 480 is set to x, the elongation of the material of each of the intermediate parts 420 and 425 is required to be at least 42%. The required amount and higher elongation characteristics may be realized with a general-purpose film adhesive such as an acrylic foam tape.

As the intermediate plate 480, the same material as the materials of the upper plate 310 and the lower plate 330 of the biosensor chip described in FIG. 3 may be used. For example, a sheet material having excellent light transmittance may be used as the intermediate plate 480.

The thickness of the intermediate plate 480 is preferably as small as possible, but the intermediate plate 480 may be substantially implemented to have a thickness of about several µm to several hundreds of µm. The intermediate plate 480 having such a thickness may be implemented as a general-purpose cover glass or a transparent polymer film.

Similar to the previous embodiment, the upper plate 310 and the lower plate 330 may be implemented using a PC substrate, the intermediate plate 480 may be implemented using a cover glass, and the intermediate parts 420 and 425 may be implemented using a double-sided acrylic foam tape. In the biosensor chip illustrated in FIG. 4B, a region through which optical signals of a light-emitting element are transmitted (cover glass insertion region), that is, a surface to which capture antibodies are fixed, is implemented as a region of four layers, such as an upper surface of the lower plate 330, a lower and upper surfaces of the intermediate plate 480, and a lower surface of the upper plate 310. The layers are arranged through alignment holes 370 using a dedicated jig (not illustrated), and the fact that the first opening 350 into which a solution containing a target antigen flows and the second opening 360 into which a mixed solution containing a substrate flows are formed in opposite surfaces is the same as that in the previous embodiment.

As described above, in the present embodiment, the surface to which the capture antibodies are fixed is doubled from two layers to four layers according to the insertion of the intermediate plate 480 as compared to the structure of FIG. 3. Therefore, the antibodies or antigens fixed to the upper and lower plates of the sensor chip are also equally fixed to the upper and lower surfaces of the intermediate plate 480, thereby further improving the sensitivity of the sensor. Therefore, an antigen-antibody specific reaction region is increased, thereby improving the characteristics of the sensor and enabling the realization of a high sensitivity biosensor chip.

More specifically, as illustrated in FIG. 4C, a specific reaction section of target antigens 496 and a complex 497 of chromogenic enzyme (HRP)/detection antibodies which are introduced differently into a four-layered 411, 482, 481, and 431 substrate, on which the capture antibody 495 is fixed initially, depending on the concentration of the target antigen 496 may be expanded, thereby implementing a high sensitivity sensor chip. The rest of the structure is the same as the content and structure described in FIGS. 3A and 3B.

Figure 5A:
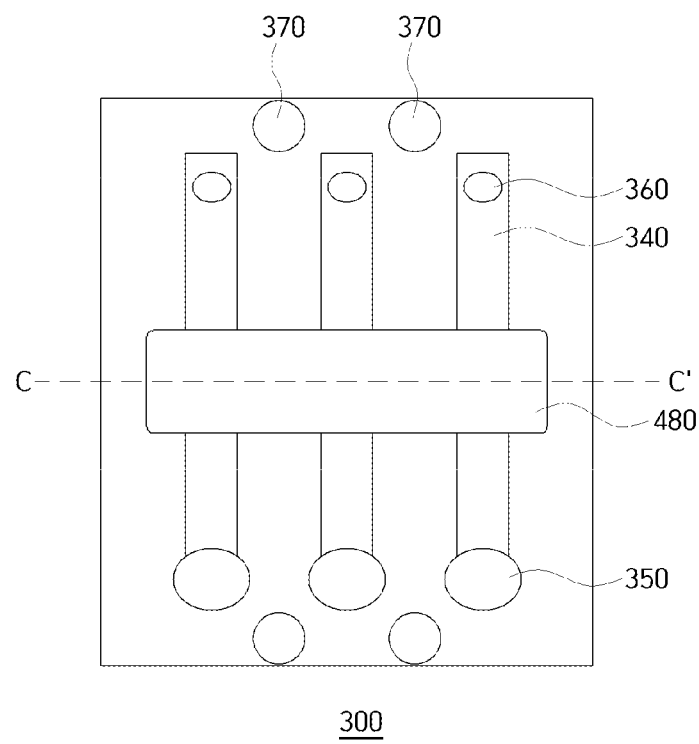
FIGS. 5A and 5B are configuration diagrams of a high sensitivity biosensor chip according to still another embodiment.
Figure 5B:
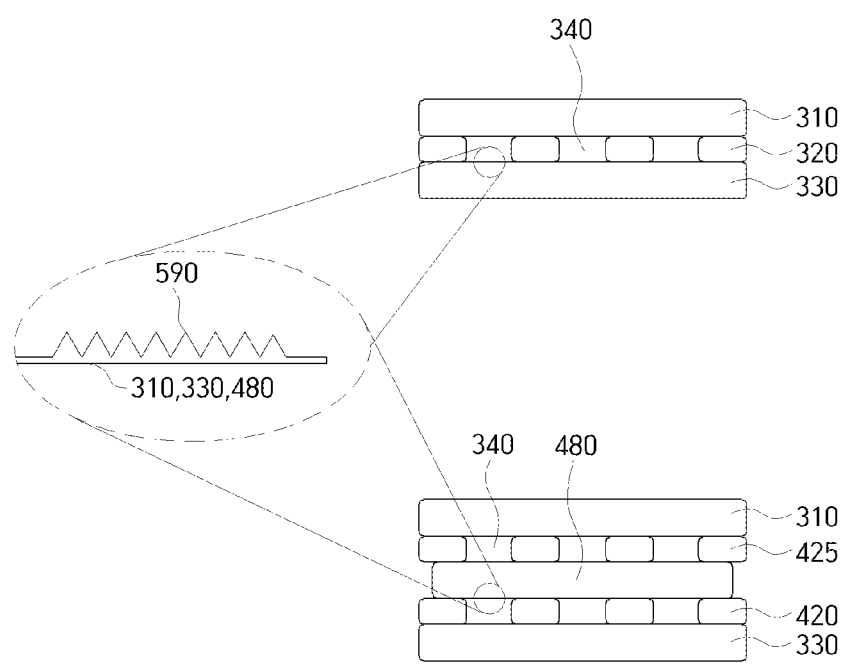

FIGS. 5A and 5B are diagrams illustrating still another embodiment for improving the sensitivity of a biosensor and illustrate an embodiment in which a high sensitivity biosensor chip is implemented by increasing a specific surface area of a region in which capture antibodies of a fluidic channel are fixed. FIG. 5A is a plan view of a biosensor chip 300, and FIG. 5B is a cross-sectional view taken along line C-C' of FIG. 5A.

As illustrated in FIG. 5B, a fine uneven structure 590 is formed on surfaces 310, 330, and 480 (substrates), on which the capture antibodies inside the fluidic channel 340 are fixed, so that the specific surface area is increased, and thus a high sensitivity biosensor chip may be implemented to increase the antigen-antibody specific reaction area.

The sensor chip according to the present embodiment may be implemented by different processes depending on materials of the upper plate 310, the intermediate plate 480, and the lower plate 330. For example, in the case of a cover glass, a general-purpose glass material having an uneven portion may be used or the uneven structure 590 may be formed through a chemical wet etching process. As another example, a polymer may be manufactured through an injection process, an atmospheric pressure plasma process, a hot embossing process, or the like.

According to the multi-layered biosensor chip and the biomarker measuring apparatus using the same of the present invention, it is possible to simultaneously measure multiple types of biomarkers in a simple way, it is possible to secure high reliability of measurement results by applying one light-emitting element and an optical splitter device, and it is possible to secure a high sensitivity biosensor by applying a multi-layer structure and a biosensor chip with an increased specific surface area. Furthermore, it is possible to solve the limitations of accessibility (ease of use) to the measurement site according to the weight reduction and modularization of biosensor equipment.

According to the biosensor of the present invention, enzyme-linked immunosorbent assay (ELISA) technology can be implemented in a simple manner. Based on the fact that saliva of animals as well as humans, which contains a large amount of biomarkers that indicate mental/physical health status, the multifunctional biomarker measuring apparatus with high sensitivity according to the present invention, which is easy to carry and in which reliability is secured, can have great utility and a ripple effect especially when point of care (POC) is required. Further, the high sensitivity multifunctional biomarker measuring apparatus can be used as a health care product in the livestock market and companion animal market, where related markets are rapidly increasing as the need for animal welfare increases.

While the configuration of the present invention has been described in detail with reference to the accompanying drawings, this is only an example, and it will be understood by those of skilled in the art that various modifications and changes within the scope of the technical spirit of the present invention. Therefore, the scope of the present invention should not be limited to the above-described embodiments and should be defined by the appended claims.

What is claimed is:

1. A multi-layered biosensor chip, which is a biosensor chip for measuring optical signal transmittance by applying a biomarker to one or more fluidic channels containing one or more chromogenic enzyme detection antibodies and one or more capture antibodies, comprising:
    a lower plate;
    an upper plate positioned to be spaced an interval from the lower plate; and
    a first intermediate part positioned between the lower plate and the upper plate such that a first fluidic channel and a second fluidic channel are provided in the interval between the lower plate and the upper plate,
    wherein the first fluidic channel includes:
        a first opening formed in the lower plate and configured to receive a flow of a solution containing a target antigen; and
        a second opening formed in the upper plate and configured to receive a flow of a mixed solution containing a substrate, and
    wherein the second fluidic channel includes:
        a third opening formed in the lower plate and configured to receive a flow of a solution containing a target antigen; and
        a fourth opening formed in the upper plate and configured to receive a flow of a mixed solution containing a substrate.

2. The multi-layered biosensor chip of claim 1, wherein the first fluidic channel includes:
    a first region in which a first chromogenic enzyme detection antibody is formed; and
    a second region in which a first capture antibody is formed, and
    wherein the second fluidic channel includes:
        a third region in which a second chromogenic enzyme detection antibody different from the first chromogenic enzyme detection antibody is formed; and
        a fourth region in which a second capture antibody different from the second capture antibody is formed.

3. The multi-layered biosensor chip of claim 1, wherein the upper plate and the lower plate are each made of a light-transmitting material.

4. The multi-layered biosensor chip of claim 1, wherein:
    the upper plate and the lower plate are each made of glass, quartz, or a material selected from among polymer materials including polycarbonate (PC), poly(methyl methacrylate) (PMMA), polystyrene (PS), and a cyclic olefin copolymer (COC); and
    the first intermediate part is made of an acrylic foam tape.

5. The multi-layered biosensor chip of claim 1, further comprising a hole which is formed to pass through the lower plate, the first intermediate part, and the upper plate.

6. The multi-layered biosensor chip of claim 1, further comprising:
    an intermediate plate positioned between the lower plate and the upper plate to be spaced intervals from the lower plate and the upper plate, wherein the first intermediate part is positioned between the lower plate and the intermediate plate; and
    a second intermediate part positioned between the upper plate and the intermediate plate such that an interval between the upper plate and the intermediate plate becomes the second fluidic channel.

7. The multi-layered biosensor chip of claim 6, wherein the intermediate plate is made of a light-transmitting material.

8. The multi-layered biosensor chip of claim 6, wherein the intermediate plate is made of the same material as a material of at least one of the upper plate and the lower plate.

9. The multi-layered biosensor chip of claim 1, wherein a surface of the first fluidic channel on which the first capture antibody is formed is made of glass, quartz, or a material selected from among polymer materials including polycarbonate (PC), poly(methyl methacrylate) (PMMA), polystyrene (PS), and a cyclic olefin copolymer (COC), and the surface includes a fine uneven structure, and wherein a surface of the second fluidic channel on which the second capture antibody is formed is made of glass, quartz, or a material selected from among polymer materials including polycarbonate (PC), poly(methyl methacrylate) (PMMA), polystyrene (PS), and a cyclic olefin copolymer (COC), and the surface includes a fine uneven structure.

\* \* \* \* \*